Jan. 22, 1935. C. C. SLEFFEL 1,988,754
INTERNAL COMBUSTION ENGINE
Filed Sept. 29, 1932   3 Sheets-Sheet 3
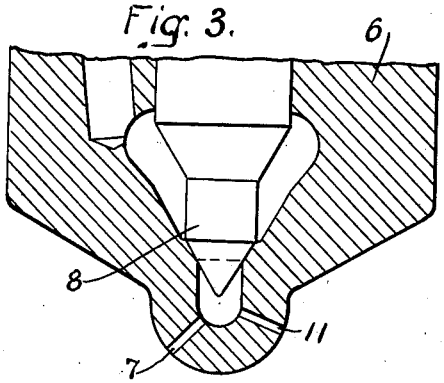
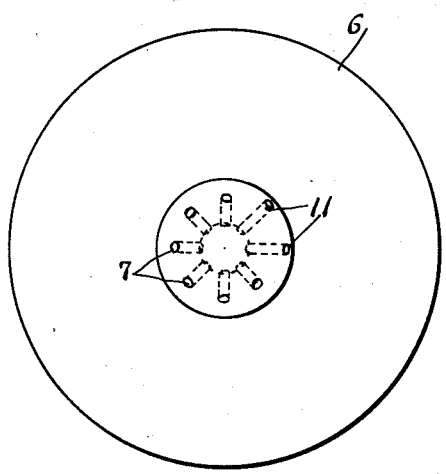
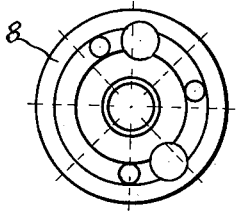
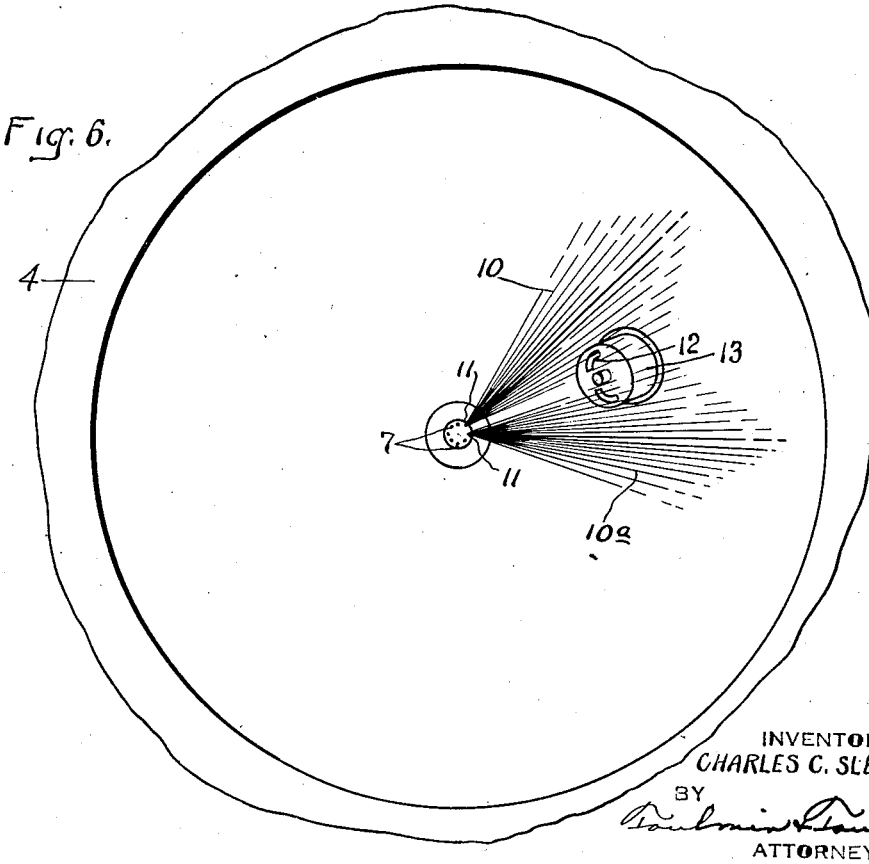
INVENTOR
CHARLES C. SLEFFEL,
BY
ATTORNEYS Patented Jan. 22, 1935

1,988,754

UNITED STATES PATENT OFFICE 1,988,754

INTERNAL COMBUSTION ENGINE

Charles C. Sleffel, Springfield, Ohio, assignor to Superior Engine Company, Springfield, Ohio, a corporation of Delaware Application September 29, 1932, Serial No. 635,369

6 Claims. (Cl. 123—32)

My invention relates to internal combustion engines.

It is my object to provide a low speed, low compression engine capable of operating by auto-ignition and by ignition through an extraneous agency, such as a spark plug, according to the operating and temperature conditions of the engine.

In particular, it is my object to provide for the control of the operation of the spark plug according to the temperature of the engine, one embodiment of my invention comprising a low compression, low speed engine so arranged that, when the engine is cold for starting and at low speeds the operation of the plug is maintained in operation by a thermostatic apparatus; and, at higher speeds or higher temperatures, as, for instance, under full load, after having once been started, the engine will operate on auto-ignition only.

It is a further object of my invention to provide a fuel injector adapted to inject fuel for combustion and simultaneously inject fuel into the combustion chamber over the spark plug in such a manner that only the vapor of the injected spray will impinge upon the spark plug points; that is, the fog on the margins of the atomized fuel will pass over the spark plug points either to one side, on both sides or along the bottom thereof which facilitates starting and prevents the fouling of the plug.

It is the object of my invention to insure good combustion by the injection of atomized fuel towards the advancing piston, in combination with the auxiliary jet or jets over the spark plug and to thereby secure the requisite distribution in the cylinder, the injection taking place at approximately the instant of maximum compression followed closely by auto or extraneous ignition.

It is my object to provide an injection of solid fuel atomized by the injector at approximately 3500 to 5000 pounds pressure into the cylinder where the contents thereof have been compressed to approximately 125–150 pounds; and to time such injection at approximately the end of the stroke, that is, about 12° before the end of the stroke.

It is a further object of my invention to provide a method and apparatus applicable to existing engines, such as gas engines by a modification of the head of the cylinder.

My engine is capable of operating on either two cycles or four cycles and to varying sizes and horsepowers. It is capable of starting cold without the use of hot spots, torches, or other starting apparatus. It is capable of operating at relatively light loads. It is capable of automatically cutting out the artificial ignition, such as a spark plug and source of current when the engine is operating as a full Diesel, in order to insure satisfactory and economical operation.

In short, it is my object to provide a working cycle embodying the advantages of the Diesel cycle but adapted to lower pressure with the main purpose in view of being able to change over gas or gasoline engines which are not built to sustain the high pressures occurring in a common Diesel engine to an oil engine working on Diesel cycles and having substantially all of its advantages while, at the same time, developing pressures which are not higher than any common gas or gasoline engine.

It is my object to eliminate putting the fuel into the cylinder a material time before the time of igniting, which has heretofore been practiced in order to secure the evaporation and gasification of the fuel.

In my invention, I inject an atomized spray of fuel at substantially the end of the stroke, that is, substantially at the top of the stroke and substantially at maximum compression whereupon ignition is almost immediate.

Referring to the drawings:

Figure 1 is an enlarged section through the cylinder and head of an engine to which the apparatus of my invention has been applied;

Figure 2 indicates diagrammatically the application of the thermocouple, thermostatic switch and source of current, such as a magneto;

Figure 3 is a section through the injector;

Figure 4 is a bottom plan view thereof;

Figure 5 is a top plan view showing the angular arrangement of the spray holders;

Figure 6 is a bottom view of the interior of the cylinder head illustrating diagrammatically the position of the auxiliary ignited fuel injection atomized sprays at the time of igniting, the main sprays being left off for the purpose of clarity.

Figure 1:
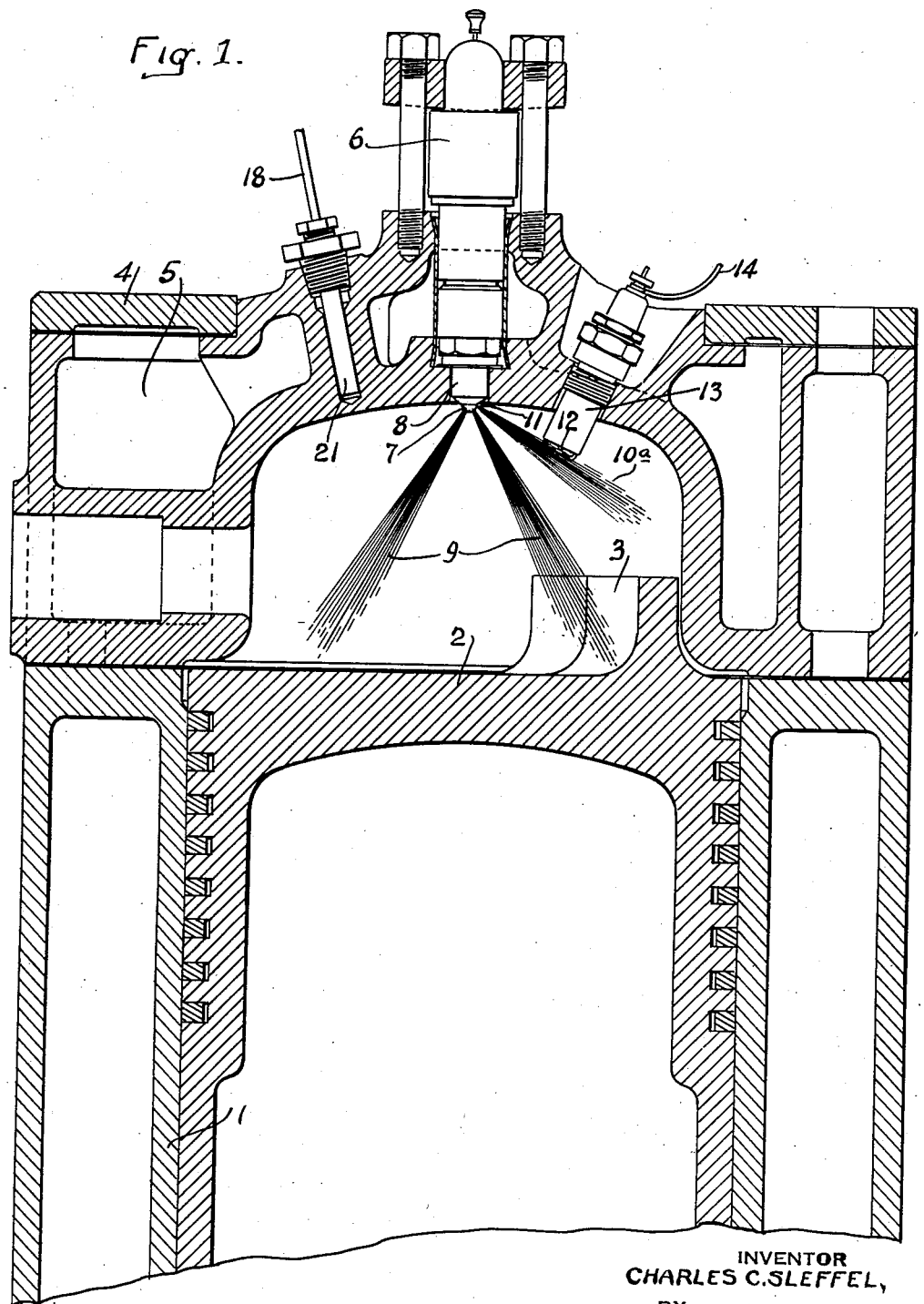

Referring to the drawings in detail, 1 indicates a cylinder which operates a piston 2 having a scavenging lip 3 which is used if the engine is a two-cycle engine in connection with directing the scavenging air proper. The cylinder is provided with a water-jacketed head 4 having the usual water passageways 5. This head carries a fuel injector 6 which discharges spray through the primary spray holes 7 as controlled by the needle valve 8. Such combustion sprays are indicated at 9 and may be made in any size and number and so arranged as to insure good combustion by reason of the injection and consequent atomization of the fuel.

An auxiliary jet 10 or auxiliary jets 10 and 10a are directed through the holes 11 so that they so pass over the electrodes 12 of the spark plug 13 that only the outer margins of the sprays engage with the electrodes.

As a consequence, the more volatile fog of the atomized spray engages the electrodes and is more easily ignited than the interior portion of the spray.

The injection takes place at about 12° before the top of the stroke. In the view shown, the piston would have about 1/32nd of an inch more to travel in an engine developing approximately the rated horsepower, two cycle.

At this time, the compression is relatively low, as known in this art, being in the neighborhood of from 125 to 150 pounds. These pressures are not exclusive but are approximately those encountered in an ordinary gas or gasoline engine of the non-Diesel type.

The fuel is injected from 3500 to 5000 pounds pressure insuring thorough atomization. When the engine is warm and operating on approximately more than half load up to full load, it operates on auto-ignition.

While the speeds of such an engine will vary according to the type of engine, and I comprehend high speed as well as low speed within my invention, yet my primary purpose is to provide a low compression, relatively low speed engine, but, in no sense is this to be construed as a limitation of the application of my invention.

For the purpose of cold starting, I provide a spark plug supplied with current through the line 14 from the magneto 15, the other side of which is connected by the line 16 to a thermostatic switch 17 which makes and breaks contact with the ground line 18a.

The making and breaking of this contact is effected through the pipe 18 having thermostatic fluid operating upon the diaphragm 19 against the spring 20. This fluid is controlled by the thermocouple 21 inserted in the cylinder head 4. Any form of thermostatic control device may be employed and may be located in any position where it will be affected by the temperature of the engine.

When the engine is cold, the circuit will be opened and the spark plug will function. It will continue to function until the temperature rises above a point at which the switch is set whereupon the ground line will be closed, the spark plug rendered inoperative and the engine will proceed to run on auto-ignition. This grounding of the circuit of the magneto is thus thermostatically controlled.

As a matter of illustration, while any form of injector may be employed, I have successfully employed an injector having eight holes equally spaced around the circumference of the injector tip, six of them making an angle of 45 degrees and the two auxiliary auto-ignition jets 10 and 10a making an angle of 72½ degrees, all with respect to the cylinder axis.

It will be understood that the number of holes, their size and direction will vary in each case and even in the same engine according to the type of fuel being employed or the rate of engine speed desired. While I have shown all of the holes in the present instance of the same diameter yet I do not wish to be so limited.

I wish to emphasize the fact that the spark occurs during the fuel injection period. Thus, in my engine, when starting or idling or whenever the ignition device is used, the spark or ignition device and the fuel injection are timed practically simultaneously.

When auto-ignition is used, then the time of injection is just before maximum compression followed shortly by auto-ignition.

Figure 2:
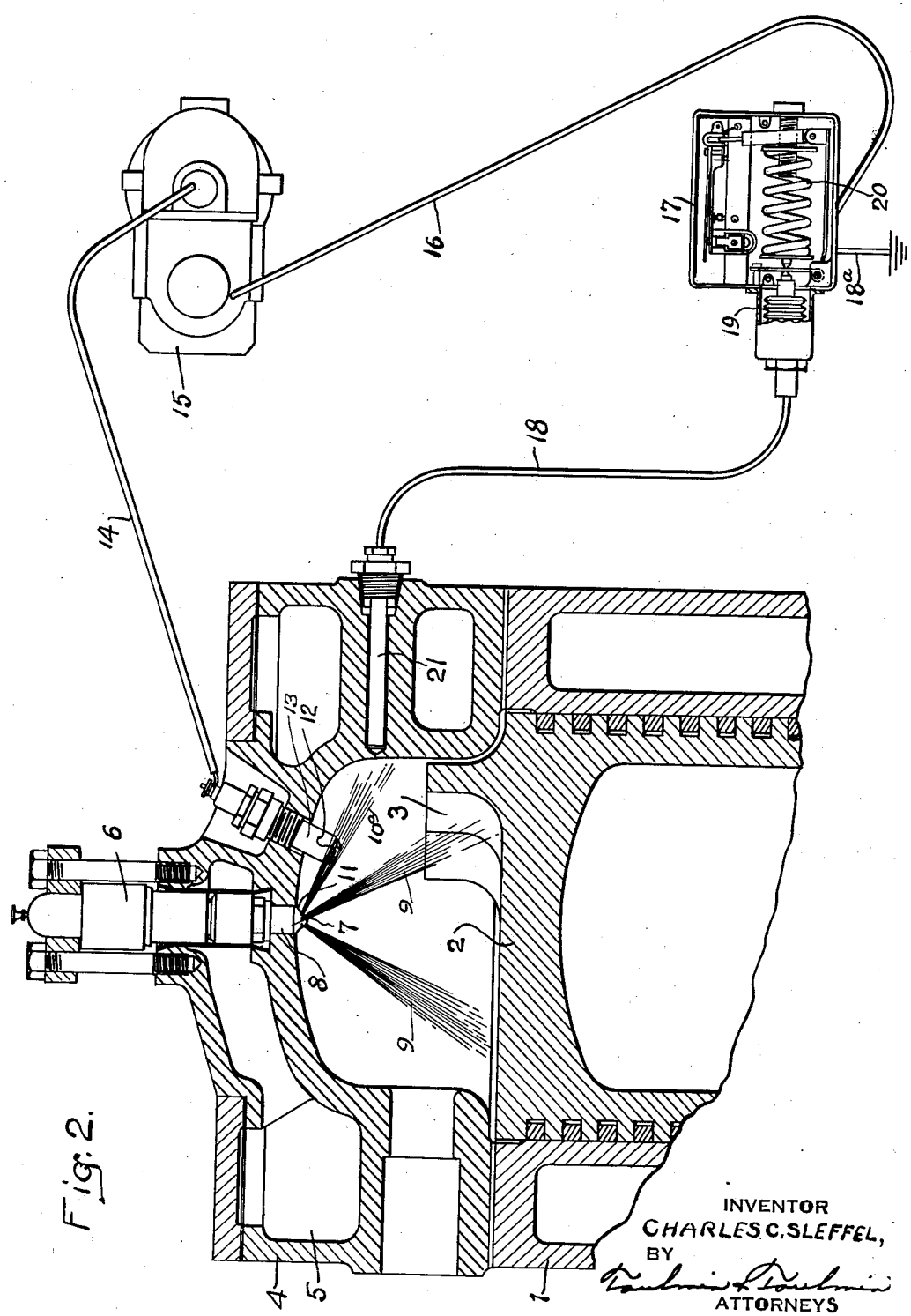

It will be noted that I have shown for the purpose of illustration two different types of heads in Figures 1 and 2 in different locations for the thermocouple. I have done this to illustrate the adaptability of my invention to different types of heads and the location of the several parts in different positions.

It will be understood that either a single fuel injector nozzle may be employed with main and supplementary sprays or separate nozzles may be employed for controlling and injecting the separate sprays.

It will be understood that I desire to comprehend within my invention such modifications as may be necessary to adapt it to varying conditions and uses.

Having thus fully described my invention, what I claim as new and desire to secure by Letters Patent, is:

1. A method of providing fuel and ignition for an internal combustion engine, comprising injecting fuel under relatively high pressure in at least three atomized sprays having fog-like exterior portions, and simultaneously applying an electric spark to the margin of one or more sprays in the fog-like portions for igniting the contents of all of the sprays within the cylinder.

2. In combination, a cylinder, a piston and a head for said cylinder forming a combustion space over the piston, a fuel injector having a plurality of main spray means and an auxiliary spray means, and a spark plug, the electrodes of which are in the path of the spray from the auxiliary spray means.

3. In combination, a cylinder, a piston and a head for said cylinder forming a combustion space over the piston, a fuel injector having a plurality of main spray means and an auxiliary spray means, and a spark plug, the electrodes of which are in the path of the spray from the auxiliary spray means and so arranged as to be located in the margin portion only of the auxiliary spray.

4. In combination, a cylinder, a piston and a head for said cylinder forming a combustion space over the piston, a fuel injector having a plurality of main spray means and an auxiliary spray means, and a spark plug, the electrodes of which are in the path of the spray from the auxiliary spray means and so arranged as to be only located in the margin portion of the auxiliary spray, said auxiliary spray means and main spray means being directed in different directions.

5. In combination, a cylinder, a piston, a fuel injector having a plurality of ports, a part of which supplies a plurality of main sprays for combustion of fuel in the cylinder and another part of which provides an auxiliary spray means for engaging a spark plug, and a spark plug arranged in the path of said spark spray.

6. In combination in an internal combustion engine, a spark plug, and a fuel injector having main sprays and a pair of supplementary ignition sprays adapted to straddle the electrodes of a spark plug to bring the margins of the sprays only over the electrodes.

CHAS. C. SLEFFEL.